Jan. 3, 1956

C. C. SMITH 2,729,176

FEED-OFF-THE-ARM KNIT GOODS MACHINE

Filed Jan. 29, 1951

INVENTOR.
CLARENCE C. SMITH

BY

ATTORNEY.

Jan. 3, 1956

C. C. SMITH 2,729,176

FEED-OFF-THE-ARM KNIT GOODS MACHINE

Filed Jan. 29, 1951

INVENTOR.
CLARENCE C. SMITH
BY
*H. C. Lissem*
ATTORNEY.

Jan. 3, 1956

C. C. SMITH 2,729,176

FEED-OFF-THE-ARM KNIT GOODS MACHINE

Filed Jan. 29, 1951

INVENTOR.
CLARENCE C. SMITH
BY
ATTORNEY.

Jan. 3, 1956
C. C. SMITH
2,729,176
FEED-OFF-THE-ARM KNIT GOODS MACHINE
Filed Jan. 29, 1951
11 Sheets-Sheet 5
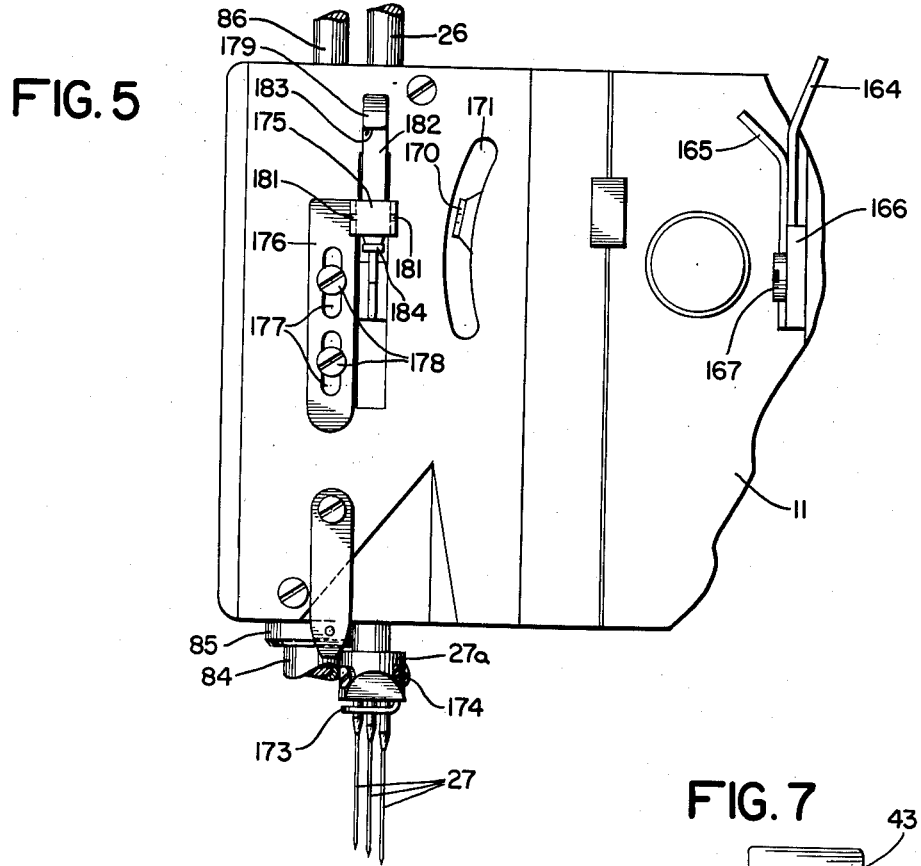
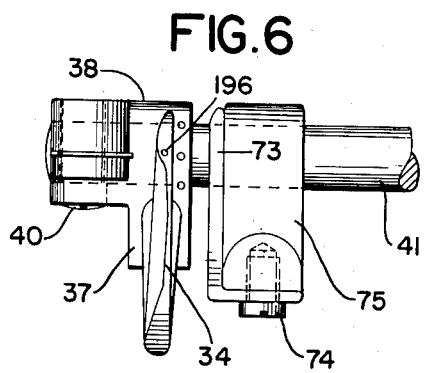
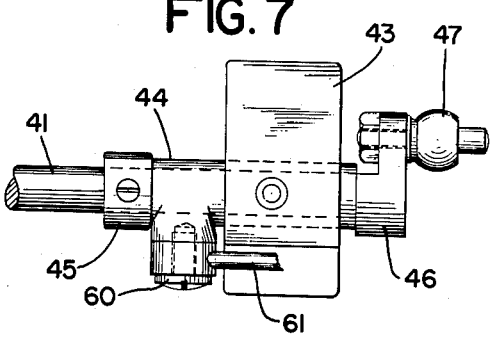
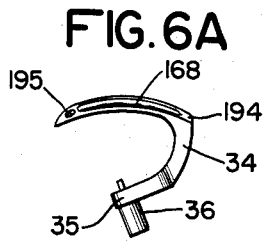
INVENTOR.
CLARENCE C. SMITH
BY
*H.C. Chesney*
ATTORNEY.

Jan. 3, 1956  C. C. SMITH  2,729,176
FEED-OFF-THE-ARM KNIT GOODS MACHINE
Filed Jan. 29, 1951  11 Sheets-Sheet 6
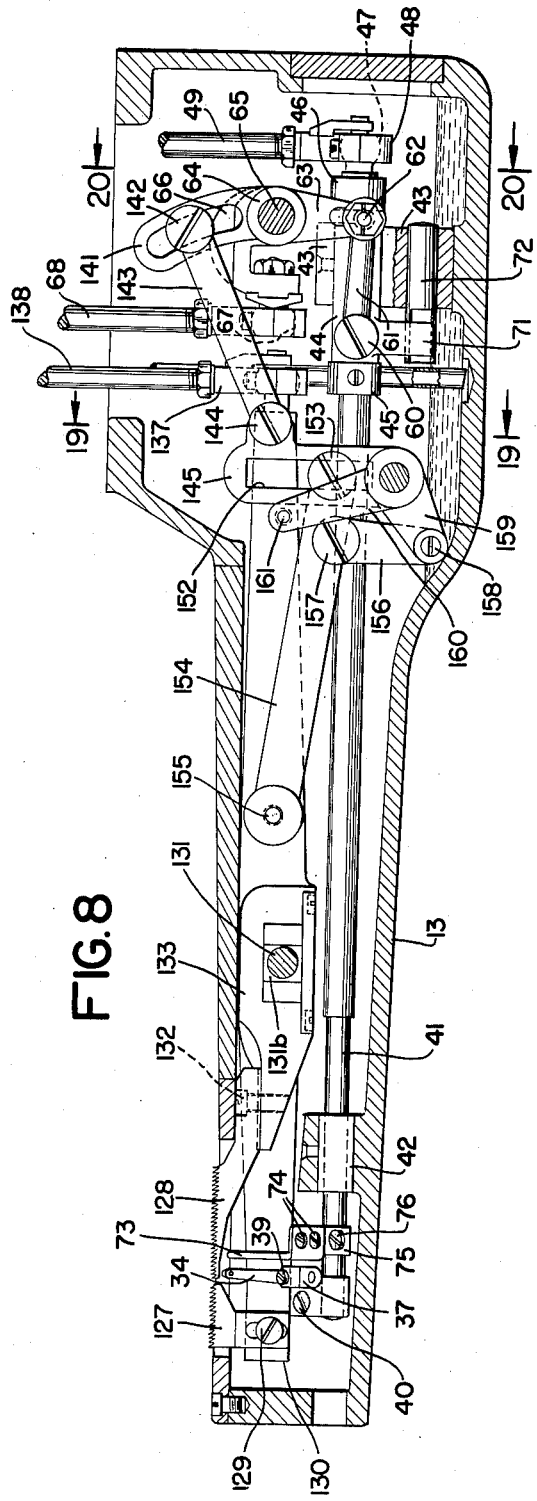
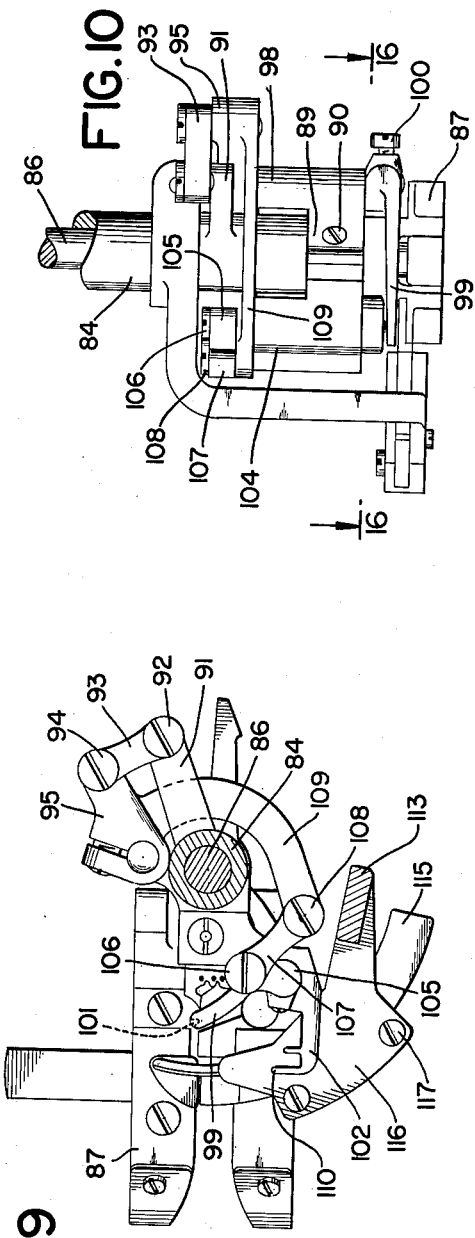
INVENTOR.
CLARENCE C. SMITH
BY
ATTORNEY.

Jan. 3, 1956  C. C. SMITH  2,729,176
FEED-OFF-THE-ARM KNIT GOODS MACHINE
Filed Jan. 29, 1951  11 Sheets-Sheet 7
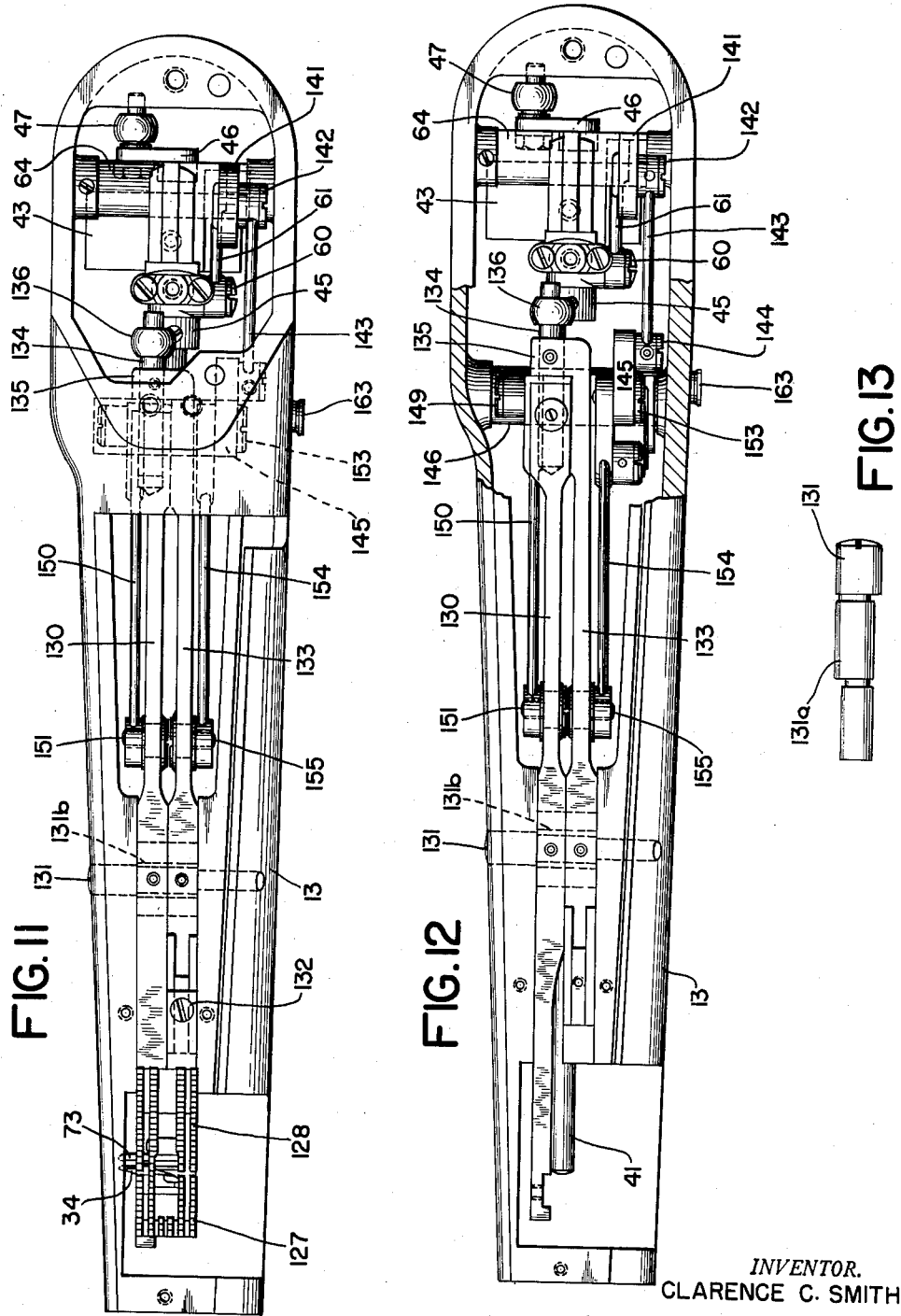
INVENTOR.
CLARENCE C. SMITH
BY
ATTORNEY.

Jan. 3, 1956  C. C. SMITH  2,729,176
FEED-OFF-THE-ARM KNIT GOODS MACHINE
Filed Jan. 29, 1951  11 Sheets-Sheet 8
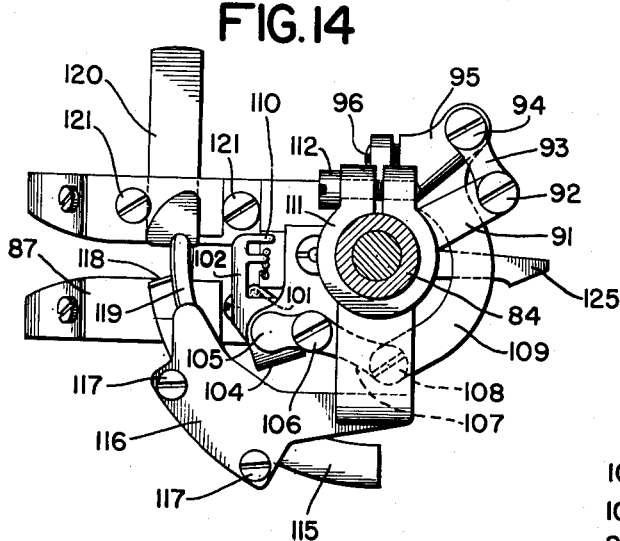
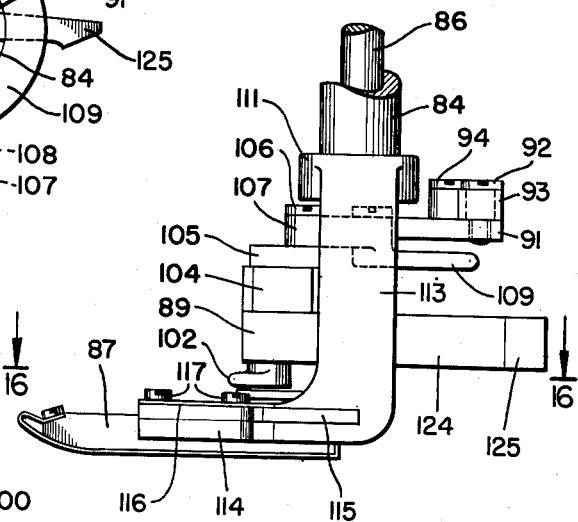
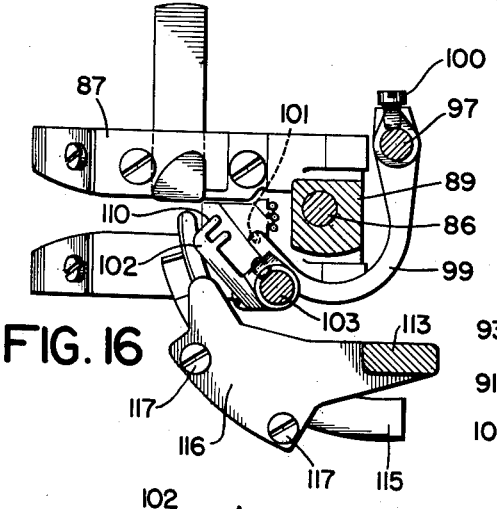
INVENTOR.
CLARENCE C. SMITH
BY
ATTORNEY.

Jan. 3, 1956  C. C. SMITH  2,729,176
FEED-OFF-THE-ARM KNIT GOODS MACHINE
Filed Jan. 29, 1951  11 Sheets-Sheet 9

INVENTOR.
CLARENCE C. SMITH
BY
ATTORNEY.

Jan. 3, 1956 　　　　C. C. SMITH 　　　　2,729,176
FEED-OFF-THE-ARM KNIT GOODS MACHINE
Filed Jan. 29, 1951 　　　　　　　　　　11 Sheets-Sheet 10
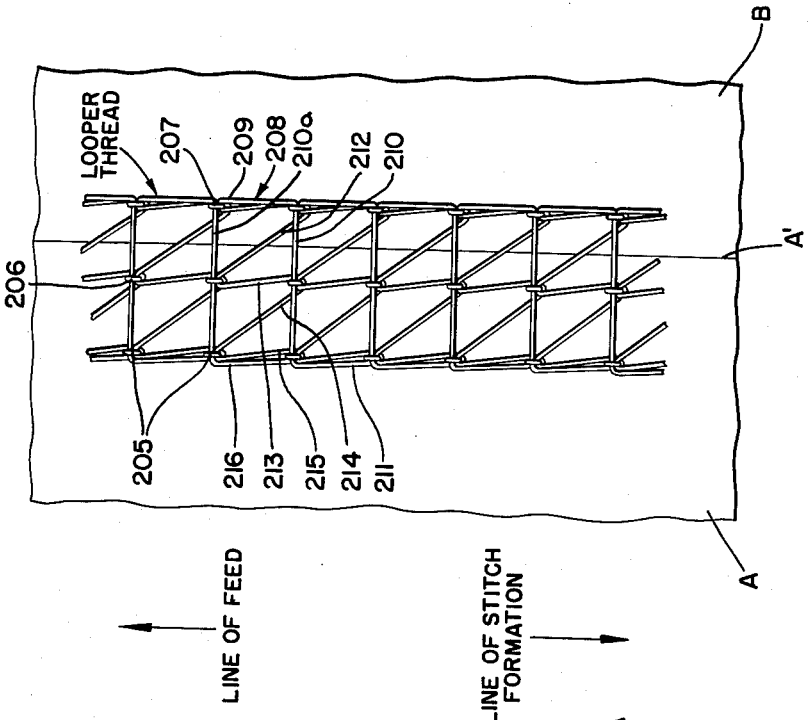
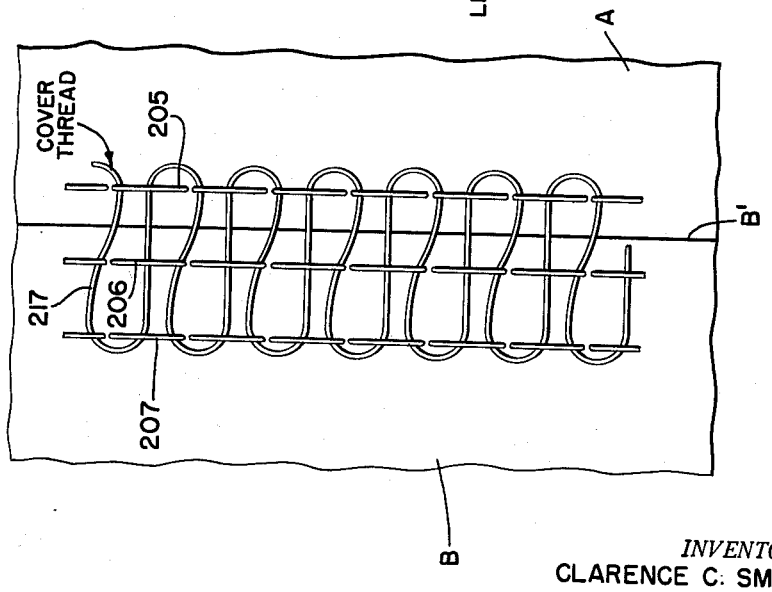
INVENTOR.
CLARENCE C. SMITH
BY
ATTORNEY.

Jan. 3, 1956
C. C. SMITH
2,729,176
FEED-OFF-THE-ARM KNIT GOODS MACHINE
Filed Jan. 29, 1951
11 Sheets-Sheet 11
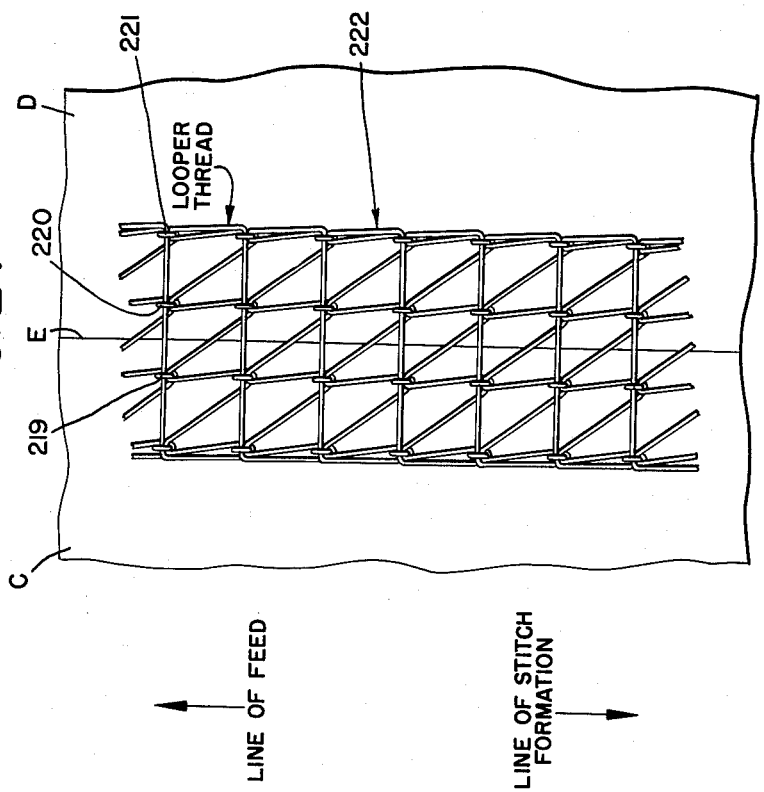
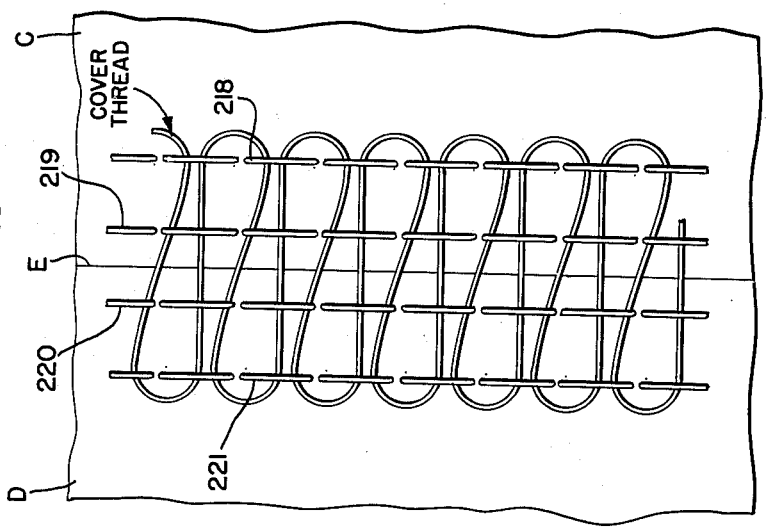
INVENTOR.
CLARENCE C. SMITH
BY
ATTORNEY.

United States Patent Office 2,729,176
Patented Jan. 3, 1956

2,729,176

FEED-OFF-THE-ARM KNIT GOODS MACHINE

Clarence C. Smith, Chicago, Ill., assignor to Union Special Machine Company, Chicago, Ill., a corporation of Illinois Application January 29, 1951, Serial No. 208,400

8 Claims. (Cl. 112—63)

This invention relates to sewing machines and more particularly to the work engaging and stitch forming devices thereof which cooperate to produce seams of a desired character. It is concerned especially with machines intended for the seaming of readily stretchable and easily raveled materials, such as knit goods.

A primary purpose of the invention has been to provide simple, durable mechanism, capable of operation at high speeds, for producing either butted or lapped seams of a type suitable for articles formed of knit goods.

Another object has been to provide an improved seam of the character indicated in which a plurality of needle threads, say three or four, cooperate in a novel manner with a single looper thread on the under side of the work and a single cover thread on the upper side of the work; the resulting seam is formed by 5 or 6 threads, depending upon the number of needles employed, is broad and extends a substantial distance across the butted or lapped edges of the pieces being united. The seam is strong and resistant to pulling out at the edges of the work, although it is formed with a relatively small number of threads.

A further object of the invention has been to provide mechanism, of the character indicated, in a feed-off-the-arm machine adapted for the seaming of tubular portions of knit garments and the like at high speed.

Special features of the invention include simple connections from a main drive shaft in the upper portion of the machine frame to main and auxiliary feed dogs in a depending and laterally extending, tubular work supporting arm. Another feature is the provision of simple connections from said main shaft for the operation of a four motion looper in said work supporting arm for cooperation with the threads carried by a plurality of needles in the formation of seams of the character indicated. Said looper operating means includes connections adapted to impart loop seizing and shedding movements which require a minimum portion of a cycle of the machine for accomplishing these purposes. A further feature is the provision of simple but effective means for controlling the supply and proper take-up of the cover thread included in the seams, as set forth.

Other objects, features, and advantages of the invention will appear from a detailed description of the invention which will now be given in conjunction with the accompanying drawings in which:

Fig. 5 is an elevational view of the needle head taken from the opposite direction;

Fig. 6 is a detail view, in plan, of the looper and its associated parts;

Fig. 6A is a face view of the looper employed;

Fig. 7 is a detail view, in plan, of parts associated with the opposite end of the looper supporting shaft;

Fig. 8 is a vertical longitudinal section through the work supporting arm of the machine;

Fig. 9 is a detail view in horizontal section along the line 9—9 of Fig. 4;

Fig. 10 is an elevational view of the parts shown in Fig. 9;

Fig. 11 is a plan view of the work supporting arm of the machine detached from the rest of the frame, the cloth plate and throat plate being removed;

Fig. 12 is a view similar to Fig. 11 but with a portion of the frame broken away to illustrate more clearly the parts within the arm, the feed dogs being removed;

Fig. 13 is a detail of a bearing pin embodied in the machine;

Fig. 14 is a view, in horizontal section along the line 14—14 of Fig. 4, showing parts of the cover thread laying mechanism, the trimmer mechanism, and the presser means;

Fig. 15 is an elevational view of the parts shown in Fig. 14;

Fig. 16 is a detail view in section along the line 16—16 of Fig. 15;

Figs. 16A and 16B are detail views, in perspective, showing portions of the cover thread laying members in relation to the needles, at different points of a cycle;

Fig. 17 is an elevational view of the parts as seen from the opposite side from that shown in Fig. 15;

Fig. 21 is a top view, on an enlarged scale, of a three needle thread seam formed by the machine;

Fig. 22 is a bottom view of said seam;

Fig. 23 is a top view of a four-needle thread seam; and

Fig. 24 is a bottom view of said seam.

Figure 1:
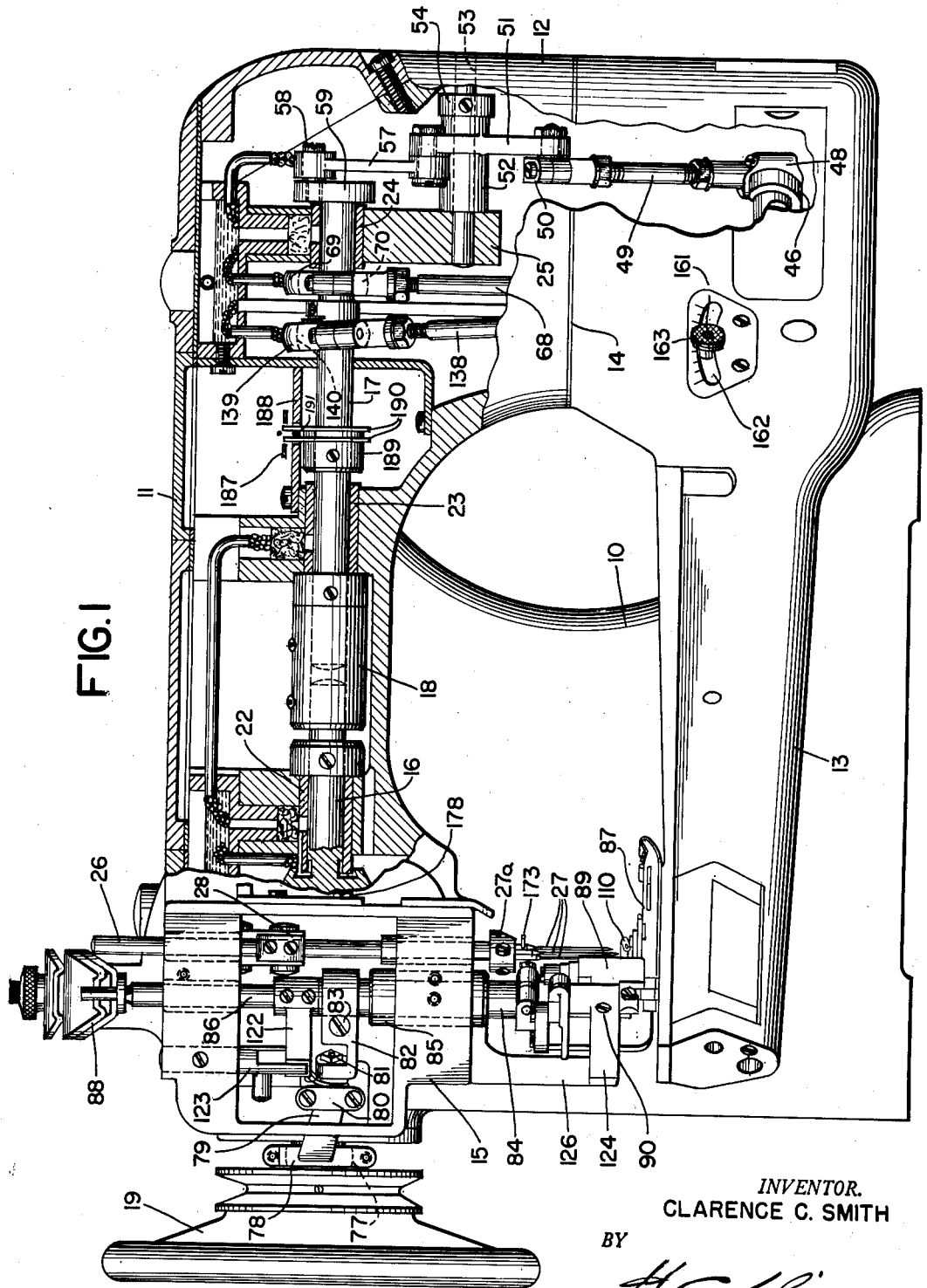
Fig. 1 is a view largely in side elevation, but partly in vertical section, of a machine embodying the invention, the needle head cover being removed.

Referring now to the drawings, the invention has been illustrated as applied to a machine having a frame of the general character of that illustrated in the application of Christensen et al., Serial No. 737,546, filed March 27, 1947, now Patent No. 2,548,869, dated April 17, 1951, which involves a vertical standard 10 having a base adapted to be supported by a table and curved upwardly and laterally to provide a main horizontally extending portion 11. At the right end (Fig. 1) of this portion of the frame a downwardly extending hollow member 12 is provided to which is secured a laterally extending work supporting arm 13. The latter may, if desired, be formed integral with the member 12, but it is preferably made as a separate unit adapted to be secured to the member 12 along the horizontal plane indicated at 14. A suitable gasket may be employed to provide an oiltight seal between member 12 and arm 13. At the opposite end of the portion 11 of the frame a laterally extending needle head 15 is provided. Extending longitudinally of the portion 11 of the frame is a main drive shaft which is preferably formed in two sections, 16 and 17, to facilitate assembly, and these are connected together by a coupling member 18. On the outer end of the shaft, which projects beyond the left end of the frame (Fig. 1), there is mounted a combined hand wheel and pulley 19. The shaft is suitably journaled in a number of bearings including a sleeve 20 mounted in a removable flanged bushing 21 (Fig. 2) at the right end of the frame. At intermediate points the two sections of the shaft are journaled in bushings 22 and 23 (Fig. 1) while at the right end of the shaft its section 17 is journaled in a bushing 24 carried by a transversely extending partition 25 in the upper portion of the hollow member 12.

A needle bar 26 (Figs. 1, 2, and 3) is mounted for vertical reciprocation in suitable bushings carried by the needle head. The needle bar carries at its lower end any desired number of needles 27, say, 3 or 4. These are disposed in a plane extending transversely of the axis of the work supporting arm 13. As shown, the lower ends of the needles are disposed at different elevations, in stepped relation, to facilitate cooperation with the looper. A block 28, secured to the needle bar, is connected by links 29 with the forward end of an arm 30 of a rock member having trunnions 31 (Fig. 2) journaled in suitable bushings in the needle head. Another arm of the rock member is pivotally connected with the end of a pitman 32 having a strap surrounding a crank portion 33 of the main drive shaft. Through the connections described it will be apparent that the needle bar will be reciprocated upon each revolution of the drive shaft.

Figure 18:
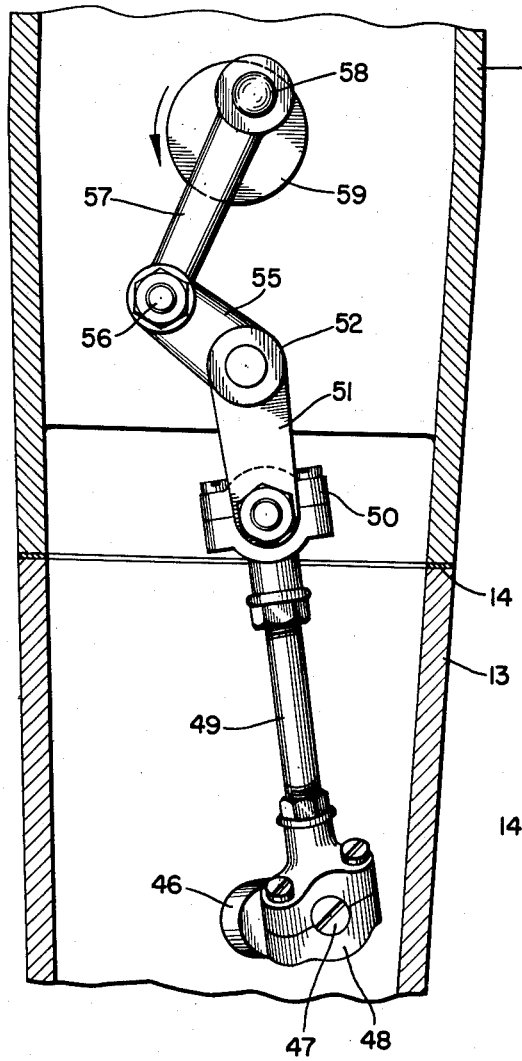
Fig. 18 is a vertical sectional view through the depending member of the frame of the machine.

Cooperating with the needles, as they are carried through the work supporting surface of the arm 13 to the interior thereof, is a single looper 34 (Figs. 6, 6A and 8). A flattened shank portion 35 of the looper carries a downwardly extending pin 36 adapted to cooperate with an opening in a projection 37 of a collar 38. A screw 39 (Fig. 8) serves to lock the pin 36 in the carrier. The latter, in turn, has a split collar portion clamped by a screw 40 on the end of a looper rod or shaft 41. The latter is rockably and slidably mounted in a bearing 42 adjacent the outer end of the work arm 13 and in another bearing mounted in an upwardly extending wall 43 at the inner end of the work support. A sleeve 44 surrounds the shaft within the bearing in the wall 43. Secured to the shaft adjacent one end of the sleeve 44 is a collar 45 (Figs. 7 and 8) while an arm 46 is integrally or otherwise secured to the shaft at the opposite end of the sleeve 44. Collar 45 and arm 46 serve to confine the sleeve against axial movement relative to the shaft. The arrangement is such, however, that the shaft may be rocked relative to the sleeve. For rocking the arm 46, it is provided with a ball pin 47 (Figs. 1, 8 and 18) which cooperates with a strap 48 at the lower end of a link 49. Another strap 50 at the upper end of this link cooperates with a ball pin at the lower end of an arm 51 which projects from a rock member 52 carried by a shaft 53 extending between the partition 25 and the end wall of the hollow member 12. A collar 54 secured to the shaft 53 holds the member 52 against axial movement in relation to the shaft, but permits rocking movement of the member. Another arm 55 (Fig. 18) of the rock member 52 carries a pin 56 connected with the lower end of a pitman 57 the opposite end of which is mounted on a crank pin 58 carried by a disc 59 at the right end of the main drive shaft (Fig. 1). Through the connections described, the looper shaft or rod 41 will be rocked through a suitable angle upon each revolution of the main drive shaft. The particular connections provided for this purpose serve to rock the looper in appropriately timed relation to the operation of the needle bar. The arrangement is such, moreover, that rapid movement of the looper takes place during the loop seizing and shedding portions of the cycle, thus enabling the single looper to seize and shed as many as 4 needle loops without the necessity of requiring an excessive needle bar movement and with a relatively small inclination of the stepped ends of the needles. In the illustrated embodiment the connections are such that the looper is oscillated through an angle of about 51° and the portion of this movement in which the point of the looper passes through the loops of the several needle threads amounts to about ⅓ of the total movement. This portion of the movement of the looper takes place during about 30° of the rotation of the main drive shaft. It has been found that excellent results in the formation of the desired stitches are produced with the points of the needles spaced along a line inclined at an angle of about 13° to the horizontal.

For imparting needle avoid movements to the looper shaft there is connected to the side of the sleeve 44, by means of a screw 60 (Fig. 8), one end of a link 61 which has its opposite end pivotally connected with a bolt 62 carried by the lower end of an arm 63 extending downwardly from a rock member 64. The latter is carried by a stationary rod or shaft 65 extending across the work supporting arm.

The bolt or stud 62 is adapted for adjustment along an elongated slot formed in the arm 63 to vary the extent of needle avoid movement imparted to the looper shaft. Rocking of the member 64 is brought about by an arm 66, integral with the member, which carries a ball stud 67 that is engaged by a strap at the lower end of a pitman 68 having at its upper end another strap 69 surrounding a spherical eccentric 70 on the main drive shaft. Through the connections described, it will be apparent that longitudinal movements, for needle avoid purposes, are imparted to the looper shaft. To prevent rotation of the sleeve 44 in the course of its reciprocation, or in response to the rocking movements of the looper shaft, the sleeve is provided with a downward extension 71 forked to straddle the end of a pin 72 carried by the wall 43. The faces of the pin which cooperate with the forked projection 71 are preferably flattened as shown in Fig. 8. Adjacent the looper 34, and in advance thereof in the line of feed, is a needle guard 73 (Fig. 8). This has substantially the same curvature as the looper about the shaft 41, and presents a flat surface adjacent the forward face of the looper spaced sufficiently from the latter to permit the free passage of the needles between the looper and the guard. The guard is secured by screws 74 to a collar 75 which is, in turn, secured adjustably to the looper shaft by a screw 76.

Cooperating with the needle threads on the upper face of the work is a cover thread laying mechanism which is best shown in Figs. 1, 2, 3, 4, 9, 10, 14, 15, 16, and 17. It is driven by a spherical eccentric 77 carried by the main drive shaft between the hand wheel 19 and the outer face of the frame. Cooperating with this eccentric is a strap 78 at one end of a pitman 79 which has a strap 80 at its opposite end cooperating with a ball pin 81 mounted in an arm 82 secured by a split collar and a screw 83 to a sleeve 84. The latter is mounted for rocking movements and is also movable longitudinally in response to movements of the presser foot, as will appear hereinafter. It is mounted in a bearing sleeve 85 in the lower portion of the needle head. Sleeve 84 surrounds a presser bar 86 which carries a presser foot 87 at its lower end and which extends upwardly through the needle head; it projects above the latter at its upper end where it is engaged by a leaf spring 88. The presser foot 87 may be of any suitable construction, but, as shown, is of the spring type. It is provided with a shank 89 (Figs. 10 and 17) having an appropriate configuration to provide a support for certain parts of the cover thread laying mechanism to be described. Shank 89 is secured to the lower end of the presser bar by means of a screw 90. Adjacent the lower end of the sleeve 84, below the bushing 85, there is provided an integral, radially extending arm 91 having pivotally connected with its outer end, by means of a screw stud 92, a link 93 (Fig. 14). The opposite end of this link is pivotally connected by a screw stud 94 with an arm 95 of a member having a split collar portion secured by a screw 96 (Fig. 17) to the upper end of a pin 97 (Fig. 16) journaled in a cylindrical portion 98 of the presser foot shank. To the lower end of the pin 97 there is secured a curved cover thread laying finger 99, this being fastened to the pin by a screw 100. The free end of the finger 99 is formed with a hook 101 (Fig. 16A) arranged to engage the cover thread and carry a loop of it transversely across the line of feed of the work. Cooperating with the finger 99 in laying the cover thread is a thread guiding member 102 secured to the lower end of a pin 103 (Fig. 16) journaled in another portion 104 (Figs. 15 and 17) of the presser foot shank. At its upper end the pin 103 is provided with a laterally extending arm 105 which has pivotally connected therewith, by means of a screw stud 106 (Figs. 9 and 10), one end of a link 107. The opposite end of this link is pivotally connected by a screw stud 108 with a curved arm 109 integral with the arm 95. Member 102 has a finger 110 at its outer end provided with a thread receiving aperture 110a (Figs. 3, 16A and 16B) for guiding the cover thread from its source of supply toward its point of engagement with the work. It serves to direct the thread horizontally across the path of the hook 101. Upon rotation of the main drive shaft the eccentric 77 will cause rocking of the sleeve 84 and the latter, through its arm 91, will rock the member 95 about the axis of the pin 97. This will carry the hook 101 of the thread laying finger 99 across the forward side of the needles from the position shown in Fig. 14 to that shown in Fig. 16 and then to that shown in Fig. 9, while simultaneously the guide member 102 will be rocked in a counterclockwise direction to carry the finger 110 substantially in the direction of the line of feed from the position of Fig. 14 to the successive positions of Fig. 16 and Fig. 9. Upon continuation of the cycle the members 99 and 102 will be restored to the positions shown in Fig. 14. During this return movement the hook 101 will seize a portion of the cover thread and carry it across the needles, so that two courses or a loop of the cover thread will be presented to the needles as they subsequently descend and pass through the work. The member 102 will at this time be in the position shown in Fig. 16B. A finger 110b will be positioned between the paths of two of the needles, as shown, and will engage one branch of the cover thread loop to hold it behind the path of the two left hand needles. It will be understood that the movement of the two thread laying members is so coordinated with the operation of the needle bar and the work feeding mechanism as to produce the effect illustrated in Fig. 21 or 23 on the upper face of the work, depending upon whether 3 or 4 needles are provided.

The machine is also provided with suitable edge trimming mechanism adapted to shear off the upwardly projecting portions of the work sections to be stitched as they pass between the two branches of the presser foot. Trimming takes place at a point a slight distance in advance of the point of stitch formation. The mechanism may be such as to form either a butted or a lapped seam, but the arrangement illustrated in the drawings is adapted to provide a butted seam. It may be modified in accordance with the teachings of the Berger Patent No. 1,768,026, dated June 24, 1930, to produce a lapped seam.

Referring now particularly to Figs. 14 and 15, the shearing mechanism comprises a split collar 111 surrounding the sleeve 84 and clamped thereon by means of a screw 112. The collar is positioned slightly above the arm 91. At one side it has a downwardly extending bracket portion 113 terminating in a laterally extending flat portion 114. Upon the latter is mounted a curved trimmer blade 115 which is clamped by means of a top plate 116 and screws 117 against the portion 114. The trimmer blade has an inclined shearing edge 118 and a projecting finger 119 which cooperate with the edge and upper surface of a stationary ledger blade 120 carried by one branch of the presser foot. This ledger blade is adjustably mounted on the presser foot by means of screws 121. It will be apparent that upon the oscillation of the sleeve 84, the cutting edge 118 of the blade 115 will be brought into cooperation with the cutting edge at the inner end of the ledger blade 120 and will serve to shear the upturned edges of the work passing between the two branches of the presser foot. To prevent turning of the presser foot and presser bar under the forces incident to the oscillation of the sleeve 84 and the operation of the shearing members, an arm 122 (Fig. 1) is attached to the presser bar by screws or the like. The arm 122 is forked at its outer end to straddle a pin 123 carried by the needle head and provided with flat surfaces for cooperation with the inner surfaces of the forked arm. In addition, the shank 89 of the presser foot is provided with a rearwardly extending arm 124 having a flat surface 125 arranged to cooperate with a corresponding surface on a bracket 126 secured to the under face of the needle head. Arm 124 and bracket 126 are so arranged as to resist the turning force produced by the shearing action of the trimmer. If desired, additional means may be provided for insuring against turning of the presser foot and the parts associated therewith.

Figure 19:
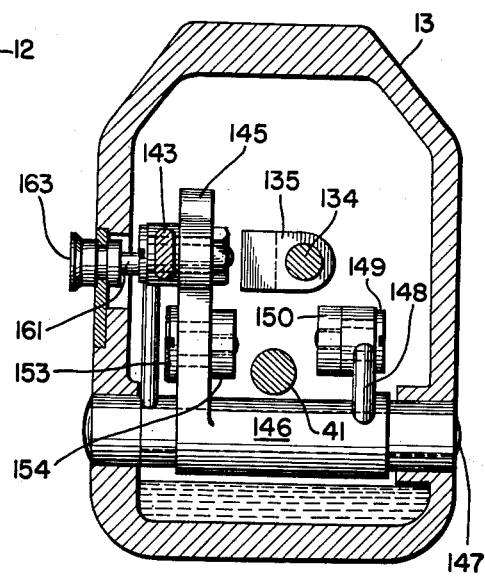
Fig. 19 is a vertical sectional view through the work supporting arm of the machine taken along the line 19—19 of Fig. 8.
Figure 20:
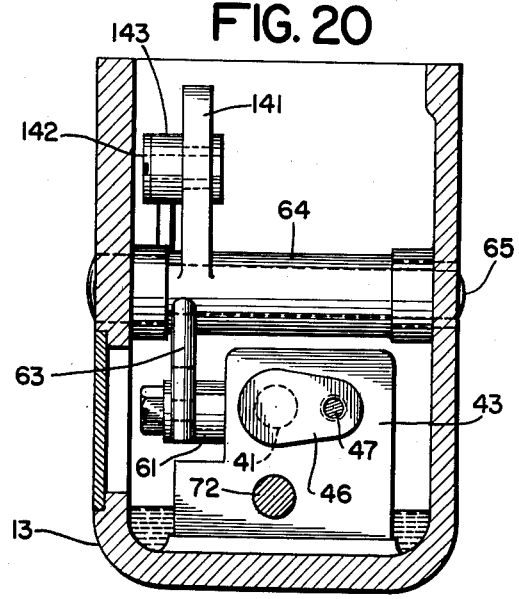
Fig. 20 is a vertical sectional view taken along the line 20—20 of Fig. 8.

The work feeding devices of the machine are best illustrated in Fig. 8. They include a main feed dog 127 and an auxiliary feed dog 128 which are arranged for differential action. Feed dog 127 is secured by a screw 129 to the outer end of a feed bar 130. A vertically elongated opening in the shank of the feed dog cooperating with the screw 129 provides for vertical adjustment. Feed bar 130 is rockably and slidably mounted on a pin 131. Similarly, the feed dog 128 is secured by a screw 132 to the outer end of a feed bar 133 which is similarly slidably and rockably mounted on the pin 131. The latter, as best shown in Fig. 13, has its central portion 131a, which carries a block 131b slidably engaged with the feed bars, formed eccentric to the two end portions of the pin. Appropriate turning of the pin provides for slight vertical adjustment of the axis about which the feed bars are rocked and in relation to which they are shifted longitudinally in the manner to be explained. Feed bar 130, as best shown in Figs. 11 and 12, is provided at its inner end with a screw-threaded ball pin 134 around the shank of which extends a laterally bent portion 135 of the feed bar 133. This arrangement is such that the two feed bars will be rocked in unison but may partake of longitudinal movement in relation to each other. The pin 134 has a ball portion 136 surrounded by a strap 137 at the lower end of a pitman 138 which carries at its upper end a strap 139 surrounding a spherical eccentric 140 on the main drive shaft. Upon rotation of the latter the feed bar 130 will be rocked about the pivot pin 131, and through the connection 135 the feed bar 133 will simultaneously be rocked about the pin 131. Longitudinal movements of the feed bars are imparted through an arm 141 extending upwardly from the rocker member 64. This arm is provided with an elongated arcuate slot adapted to receive a bolt 142 which may be adjusted to any desired position along the slot and set to provide the desired feed stroke for the main feed dog. A link 143, pivotally connected with the stud 142, is connected at its opposite end by a screw stud 144 with an arm 145. The latter extends upwardly from a sleeve 146 (Fig. 19) rockably mounted on a stud or shaft 147. Another upwardly extending arm 148, integral with the sleeve, is connected by a screw stud 149 with a link 150 which, at its opposite end, is connected by a screw stud 151 with the feed bar 130. The arm 145 has an elongated slot 152 which receives a screw stud 153 at the inner end of a link 154. At its opposite end, this link is pivotally connected by a screw stud 155 with the feed bar 133. The position of the stud 153 along the slot 152 may be varied at will by lifting the inner end of the link 154. For this purpose there is attached to this link, by a screw stud 157, a downwardly extending link 156 the lower end of which is connected by a stud 158 with an arm 159 freely journaled upon the shaft 147 adjacent the arm 145. An upwardly extending arm 160 of the same member carries a pin 161 at its upper end which projects through an elongated opening 162 in the wall of the work supporting arm and carries at its outer end a knurled nut 163. By loosening the latter the pin 161 may be shifted to any desired position along the opening 162 and thereby adjust the stud 153 to the desired position along the slot 152. Suitable scale marks may be provided along the edge of the opening 162 to indicate the stroke of the feed bar 133 in relation to the feed bar 130, i. e., the differential, if any, between the two. It will be seen from the foregoing that the stroke of both feed dogs may be simultaneously varied by adjustment of the stud 142 along the arm 141. Independent adjustment of the stroke of the auxiliary feed dog may be effected by adjustment of the stud 153 along the slot 152, in the manner explained.

Suitable means are provided for controlling the various threads embodied in the seam produced by the machine. As will be understood, the several threads are drawn from suitable cones, supported by a stand adjacent the machine, and are delivered therefrom to tensioning devices, not shown, carried by the frame of the machine. From the tensioning devices the several needle threads and the cover thread are passed to a stationary guide 164 (Figs. 2, 3 and 5) secured to the forward face of the portion 11 of the frame. Associated with this guide is a second fixed guide 165 which is inclined forwardly from the vertical, as shown in Fig. 5. Guide 164 has a lateral extension 166 which is secured by a screw 167 to the machine frame. Guide 165 is mounted on the guide 164 in a manner to permit vertical adjustment in relation to the latter. For this purpose an elongated slot 168 in the guide 165 cooperates with the shank of a screw 169, having threaded engagement with the guide 164. The needle threads are passed through holes 164a in the guide 164 and then through holes 165a in the guide 165. From this point these threads are passed through eyelets in an L-shaped member 170 (Figs. 2, 3, and 5) which extends through an arcuate slot 171 in the needle head and is secured to the side of the needle lever 30 by screws 172. From the take-up member 170, which is oscillated within the opening 71 upon rocking of the lever 30 in the operation of the machine, the needle threads are passed downwardly to a guide 173 secured by a screw 174 to the needle retaining member 27a. From the guide 173 the threads are passed through the eyes of the needles.

The cover thread is lead from its tensioning means through an eyelet 164b in the guide member 164 and then to a fixed, U-shaped, double guide 175 (Figs. 2, 3 and 5) carried by the needle head. This guide has a downwardly extending, plate-like portion 176 having vertically elongated slots 177 cooperating with screws 178 which serve to secure the guide to the needle head. The elongated slots permit vertical adjustment of the guide in relation to the needle head. Between the branches of the U formed by the guide 175 there is disposed a take-up member 179. This is secured by a screw 180 (Fig. 2) to one face of the block 28 carried by the needle bar 26. It will be apparent that the take-up member 179 will partake of the vertical reciprocations of the needle bar. A curved face 182 on the take-up member cooperates with that portion of the cover thread which extends between eyelets 181 in the branches of the guide 175. As the member 179 is reciprocated, the thread will be cammed to different extents in a horizontal direction by the face 182. As the needle bar and the take-up member 179 approach the lower end of their stroke, a shoulder 183 on the member engages the thread and carries it downwardly a suitable distance below the line passing through the eyelets 181. Similarly, at the upper end of the stroke of the take-up member a shoulder 184 at the lower end of the camming face 182 engages the thread to lift it a slight distance above the line of the eyelets 181. Accurate control of the cover thread is provided by this arrangement at all times.

The looper thread is led from its tensioning means to a stationary guide 185 and thence laterally to and through another stationary guide 186. Between these stationary guides is a T-shaped member 187 having an elongated opening therethrough. This member is secured by screws or the like to a plate 188 which is fastened by screws 188a to a portion of the frame. Provision is made for slight lateral adjustment of the plate. For the purpose of taking up the looper thread at the appropriate times, a member 189 is secured to the main shaft 17 of the machine beneath the plate 188. Member 189 is provided with a pair of spaced camming discs or elements 190 which are of appropriate shape to impart the desired take-up action to the looper thread at all times. The thread is held in cooperation with the cam elements by the stationary guides 185 and 186. A finger 191 extends horizontally between the two cam elements just above the hub of the member 189. Finger 191 is carried by a pin 192 mounted in a bracket 193 secured to the plate 188. The thread, in its passage from the guide 185 to guide 186, passes over the finger 191 which serves as a stripper and prevents the thread from being carried around with the cam elements 190 as they rotate. From the stationary guide 186 the thread is suitably directed along the frame by suitable eyelets (not shown) to the looper 34. It enters the looper through an eyelet 194 in the heel and passes along the face of the looper opposite to that illustrated in Fig. 6A and then emerges through an opening 195 adjacent the point of the looper. As shown in Fig. 6A, the outer face of the looper is provided with a wide shallow groove which facilitates the handling of the looper thread and the proper formation of stitches.

Figure 2:
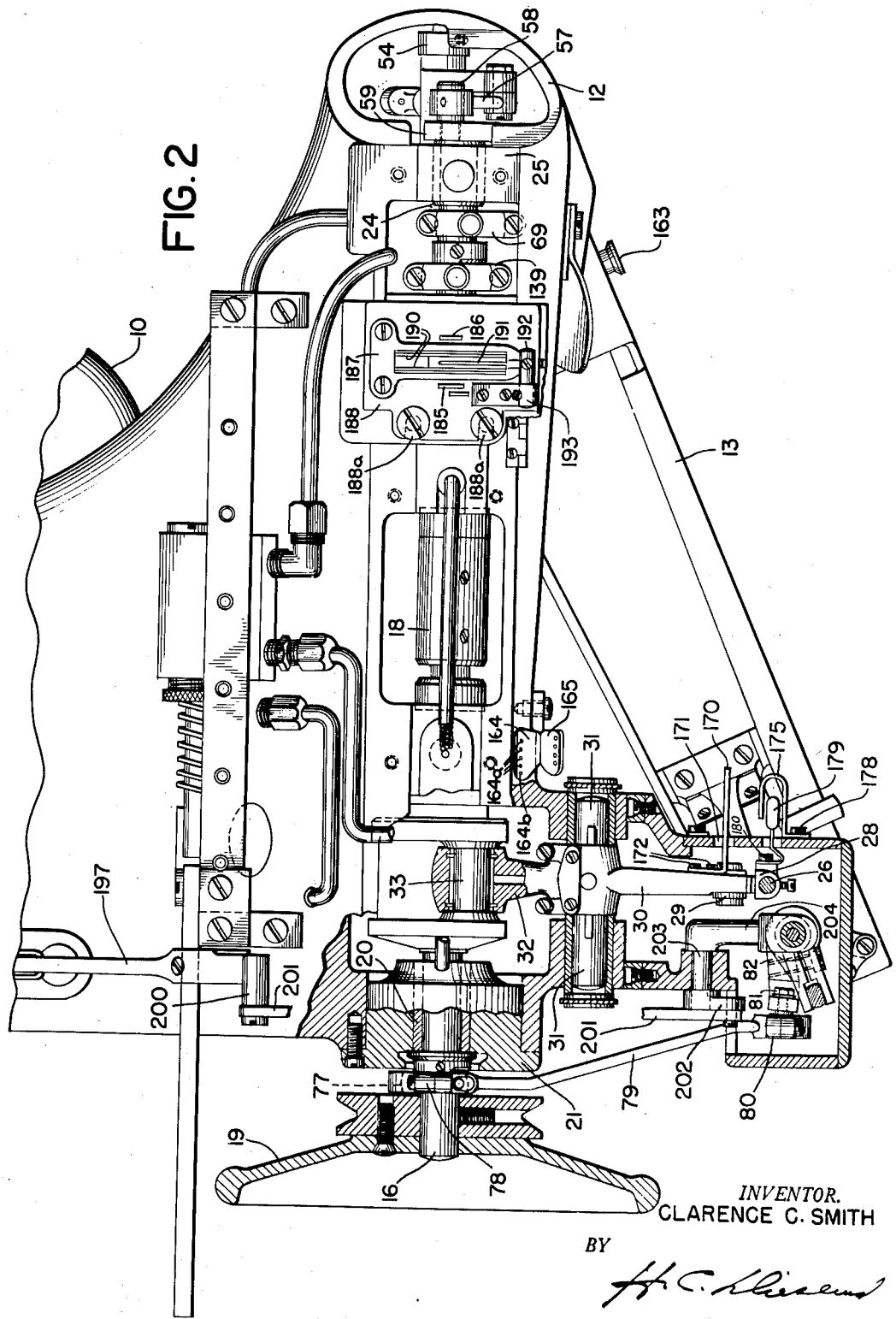
Fig. 2 is a view largely in plan, but partly in horizontal section through a portion of the machine, with certain cover members being removed and a portion of the standard being omitted.
Figure 3:
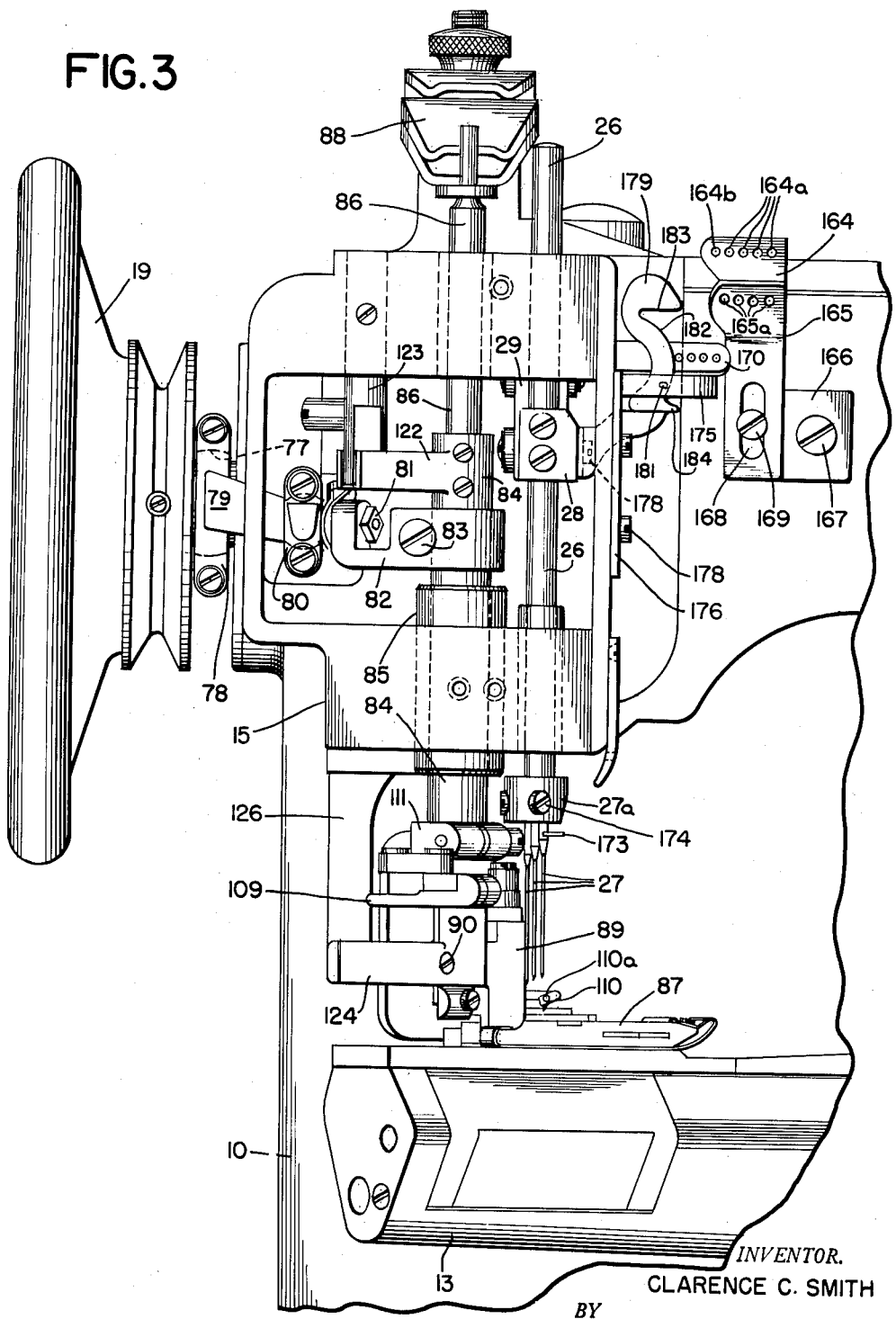
Fig. 3 is an enlarged side elevational view of the needle head portion of the machine and a portion of the work supporting arm, the needle head cover being removed.
Figure 4:
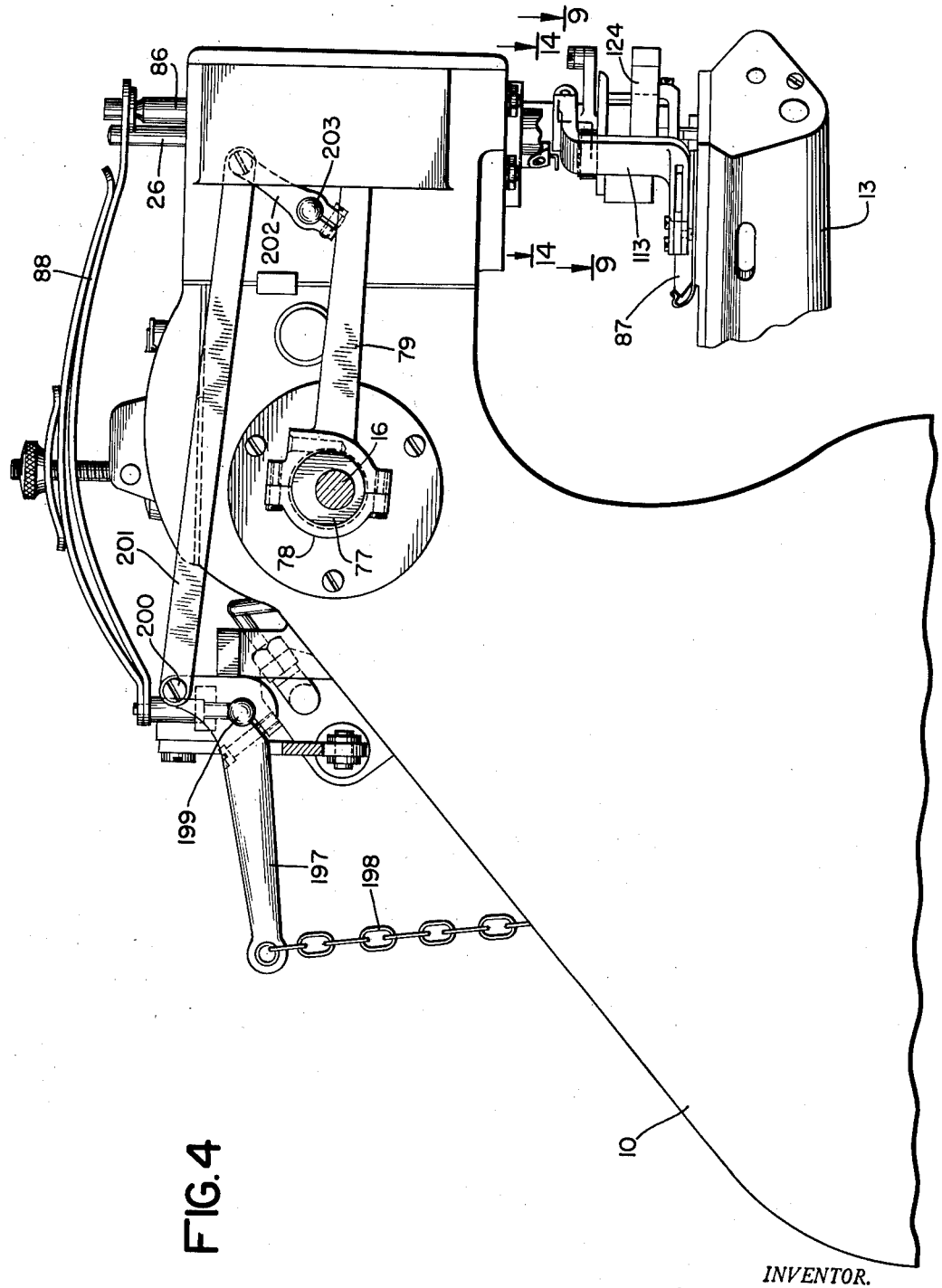
Fig. 4 is an end elevational view of the portions of the machine illustrated in Fig. 3, with the driving pulley omitted and certain parts shown in section.

For lifting the presser bar to facilitate the introduction and removal of work, any suitable means may be employed. This may comprise a lever 197 (Fig. 4) connected by a chain 198 with a foot treadle or knee press or the like. The lever is pivotally mounted on the frame of the machine by a stud 199. An upwardly extending arm of the lever carries a screw stud 200 on which is pivotally mounted one end of a link 201. The opposite end of this link is pivotally connected with the outer end of an arm 202 secured to a rock shaft 203. The latter, as best shown in Fig. 2, passes through a wall of the needle head and carries at its inner end an arm 204 adapted to cooperate with the collar 84 (Figs. 1 and 3) secured to the presser bar.

As illustrated, the machine is preferably provided with suitable means for effecting automatic lubrication of the various operating parts. This lubrication system, however, forms no part of the invention to be claimed herein and, therefore, need not be described. It may suitably be of the type disclosed in my Patent No. 2,430,370 granted November 4, 1947.

The coordinated operation of the various operating devices is believed to be clear from the foregoing detailed description. It may be briefly summarized as follows: The work is introduced beneath the presser foot as the latter is raised slightly by a knee press or the like. In advancing toward the stitching point the free edges of the fabric sections to be united are trimmed and placed in either butted or lapped relation. When the work reaches the stitching point a loop of cover thread is laid across the seam from the guide opening in finger 110 from which it extends to and around the hook 101 of member 99 by which the loop has previously been seized. As the needles descend they pass in the particular relation to the cover thread loop to be described in connection with the resulting seams. As the needles penetrate the work they will pass through the loop of looper thread which is held in position at this time for such action. The looper rod 41 is then rocked in its loop shedding direction and is given its needle avoid movement in readiness for its return rocking movement to seize the needle thread loops. After the needles have reached their lower limits and have begun to rise, the looper rod is given its loop seizing movement in which the looper is carried through the loop of all of the needle threads. As the needles continue to rise and pass out of the work, the looper rod is shifted longitudinally, to impart its opposite needle avoid movement to the looper. The cover thread laying members are also oscillated at this time to create a new loop of cover thread for the next descent of the needles. During this part of the cycle the work feeding devices operate to advance the work and the trimmer mechanism operates to trim a portion of the edge of the work. The looper remains in its last mentioned position until the needles again penetrate the work and enter the loop of looper thread. This cycle is repeated until the seam is completed and the work is removed from the machine.

Turning now to Figs. 21 and 22, there is illustrated a form of seam adapted to be produced by the improved machine with three needle threads, a single looper thread, and a single cover thread. The three needle threads are indicated at 205, 206, and 207 and are formed into a series of parallel loops on both faces of the work. As shown in Fig. 21 these loops are of substantial length on the upper face of the work, i. e. equal to the stitch length for which the machine is set. On the under face of the work, as shown in Fig. 22, the loops simply encircle the various portions of looper thread incorporated therein in the formation of the seam. The looper thread is indicated generally at 208 in Fig. 22 and as traced from a loop 209, which is held by one of the loops of needle thread 207, it has one branch 210 which extends across the line of seam formation, and then downwardly into a loop 211 which is interengaged with the next succeeding loop of needle thread 205. The other branch of loop 209 passes completely around the loop of needle thread 207 through which the branch 210 has been passed, thence upwardly along line 212 through the next preceding loop of the needle thread 206, thence downwardly along line 213 completely around the loop of needle thread 206 through which the branch 210 extends, then upwardly along line 214 through the preceding loop of needle thread 205, then downwardly along line 215 to pass completely around the loop of needle thread 205 through which the branch 210 extends, and finally upwardly along line 216 to and through the preceding loop of needle thread 205 to form a branch 210a for the preceding stitch corresponding with the branch 210 described. It will be understood that the seam is formed by a succession of stitches of this character in which the several needle threads and the looper thread are interengaged in the manner described. At the same time a cover thread 217 is looped back and forth by the two cover thread laying members 99 and 102 to produce the effect shown in Fig. 21. As the needles are descending to and through the work, the cover thread will be held in such a way that the needles carrying the threads 206 and 207 will pass in front of the two branches of the loop of cover thread, while the thread carried by needles 205 will pass between the two branches of the cover thread loop.

In the production of the foregoing three needle-thread seam, the fabric sections A and B will be overlapped, as indicated in the two views, in such a way as to position the free edge A' of the under section of material between the lines of needle thread loops 206 and 207, while the free edge B' of the upper section of material will extend between and be parallel with the lines of needle thread loops 205 and 206.

Referring now to Figs. 23 and 24 there is shown a seam composed of four needle threads, a single looper thread, and a single cover thread. This type of seam may be employed in connection with either butted work pieces or lapped work pieces. It is illustrated in connection with butted work pieces in which the two sections of fabric C and D are butted along the line E.

The form of the four needle-thread seam is quite similar to the three needle-thread seam. Four lines of needle thread loops 218, 219, 220 and 221 are formed. A single looper thread 222 is passed through and around the various needle thread loops, on the underside of the work, in the same manner as for the three needle-thread seam, to produce the effect indicated in Fig. 24. On the upper surface of the work, a single cover thread 226 is also disposed in a series of loops across the lines of needle thread loops in substantially the same manner as described in connection with Fig. 21. The relationship between the cover thread and the needle thread loops 219, 220 and 221 is the same as in the three needle-thread seam. In addition to this, the cover thread is presented in the same relation to the needle thread loops 218 as to the needle thread loops 219. The resulting seam is a strong and durable one having distinct advantages over somewhat similar seams having a greater number of threads.

While an illustrative machine capable of achieving the desired objects and embodying various novel features of the present invention and several novel seams produced in accordance with the invention have been disclosed in considerable detail, it will be understood that various changes may be made in the construction and arrangement of the various elements without departing from the general principles and scope of the invention as defined by the appended claims.

What I claim is:

1. In a sewing machine having a main frame with a single drive shaft extending longitudinally thereof, a downwardly extending hollow member at one end of said frame and a tubular work supporting arm projecting laterally from the lower end of said member, the combination which comprises a needle bar carrying a plurality of needles mounted for reciprocation in said frame above said work arm, a single four motion looper in said arm arranged to cooperate with the threads carried by said plurality of needles to form a plurality of lines of stitching, connections from said drive shaft adjacent one end thereof for reciprocating said needle bar, connections from said shaft adjacent the other end thereof including a rock member mounted upon a fixed pivot in said hollow member for oscillating said looper to impart loop seizing and shedding movements thereto, said rock member having a pair of arms extending at an obtuse angle in relation to each other from the pivot of said member, one of said arms extending upwardly and laterally from said pivot and the other extending downwardly from said pivot, said last mentioned connections including also motion imparting means on said shaft, means connecting said motion imparting means with the upwardly extending arm of said rock member, and means connecting the downwardly extending arm of said rock member with said looper for oscillating the latter, and connections from said shaft adjacent said other end thereof for shifting said looper bodily for needle avoid purposes.

2. In a sewing machine having a main frame with a single drive shaft extending longitudinally thereof, a downwardly extending hollow member at one end of said frame and a tubular work supporting arm projecting laterally from the lower end of said member, the combination which comprises a needle bar carrying a plurality of needles mounted for reciprocation in said frame above said work arm, said needles being disposed in a plane transverse to the axis of said arm, a four motion looper in said arm arranged to cooperate with the threads carried by said plurality of needles to form a plurality of lines of stitching, a shaft carrying said looper and mounted for rocking and axial movements, connections from said drive shaft adjacent the end thereof in the region of said needle bar for reciprocating said needle bar, a rock member mounted in said hollow member for rocking movement about a horizontal axis, said rock member having an upwardly and laterally extending arm and a downwardly extending arm, eccentric means on said drive shaft above said rock member, a pitman connecting said eccentric means with said upwardly extending arm, an arm extending laterally from said looper carrying shaft, a link pivotally connected with said last mentioned arm and with the lower end of said downwardly extending arm of said rock member for oscillating said looper carrying shaft to impart loop seizing and shedding movements to said looper, and connections from said drive shaft for shifting said looper carrying shaft axially to impart needle avoid movements thereto.

3. In a sewing machine having a main frame with a single drive shaft extending longitudinally thereof, a downwardly extending hollow member at one end of said frame and a tubular work supporting arm projecting laterally from the lower end of said member, the combination which comprises a needle bar carrying a plurality of needles mounted for reciprocation in said frame above said work arm, said needles being disposed in a plane transverse to the axis of said arm, a four motion looper in said arm arranged to cooperate with the threads carried by said plurality of needles to form a plurality of lines of stitching, a shaft carrying said looper and mounted for rock and axial movements, said drive shaft and said looper carrying shaft being horizontally disposed and vertical planes containing the axes of said shafts being at an acute angle to each other, connections from said drive shaft adjacent the end thereof in the region of said needle bar for reciprocating said needle bar, a rock member mounted in said hollow member for rocking movement about a horizontal axis, said rock member having an upwardly and laterally extending arm and a downwardly extending arm, eccentric means on said drive shaft above said rock member, a pitman connecting said eccentric means with said upwardly extending arm, an arm extending laterally from said looper carrying shaft, a link pivotally connected with said last mentioned arm and with the lower end of said downwardly extending arm of said rock member for oscillating said looper carrying shaft to impart loop seizing and shedding movements to said looper, and connections from said drive shaft for shifting said looper carrying shaft axially to impart needle avoid movements thereto.

4. In a sewing machine having a main frame with a single drive shaft extending longitudinally thereof, a downwardly extending hollow member at one end of said frame and a tubular work supporting arm projecting laterally from the lower end of said member, a vertical plane containing the axis of said arm being disposed at an acute angle to a vertical plane containing the axis of said drive shaft, the combination which comprises a needle bar carrying a plurality of needles mounted for reciprocation in said frame above said work arm, said needles being disposed in a plane transverse to the axis of said arm, a single four motion looper in said arm arranged to cooperate with the threads carried by said plurality of needles to form a plurality of lines of stitching, means carried by said needle head arranged to lay a single cover thread across the lines of stitching for interengagement with all of the needle threads, and connections from said drive shaft for reciprocating said needle bar, imparting loop seizing and shedding movements and needle avoid movements to said looper and for operating said cover thread laying means, said connections including a rock member mounted in said hollow member for oscillation about a fixed axis beneath and parallel with that of said drive shaft and connected with said looper for imparting loop seizing and shedding movements thereto, said rock member having a pair of arms extending at an obtuse angle in relation to each other from said fixed axis, one of said arms extending upwardly and laterally from said pivot and the other extending downwardly from said pivot, said last mentioned connections including also motion imparting means on said shaft, means connecting said motion imparting means with the upwardly extending arm of said rock member, and means connecting the downwardly extending arm of said rock member with said looper for imparting loop seizing and shedding movements to the latter.

5. In a sewing machine having a main frame with a single drive shaft extending longitudinally thereof, a downwardly extending hollow member at one end of said frame and a tubular work supporting arm projecting laterally from the lower end of said member, the combination which comprises a needle bar carrying a plurality of needles mounted for reciprocation in said frame above said work arm, a four-motion looper in said arm arranged to cooperate with the threads carried by said plurality of needles to form a plurality of lines of stitching, cover thread laying means above said work arm for laying a single cover thread across the seam for interengagement with threads carried by said plurality of needles, connections from said single drive shaft for operating said needle bar, said looper and said cover thread laying means, fixed and spaced guides adjacent said needle bar for directing said cover thread horizontally in a portion of its travel, and means carried by said needle bar cooperating with said guides to take up and yield said cover thread as required, said means having a plurality of spaced substantially horizontal shoulders arranged to engage said cover thread between said guides and displace the same at the upper and lower limits of movement of said needle bar.

6. In a sewing machine having a main frame with a single drive shaft extending longitudinally thereof, a downwardly extending hollow member at one end of said frame and a tubular work supporting arm projecting laterally from the lower end of said member, the combination which comprises a needle bar carrying a plurality of needles mounted for reciprocation in said frame above said work arm, a four-motion looper in said arm arranged to cooperate with the threads carried by said plurality of needles to form a plurality of lines of stitching, cover thread laying means above said work arm for laying a single cover thread across the seam for interengagement with threads carried by said plurality of needles, connections from said single drive shaft for operating said needle bar, said looper and said cover thread laying means, fixed and spaced guides adjacent said needle bar for directing said cover thread horizontally in a portion of its travel, and means carried by said needle bar cooperating with said guides to take up and yield said cover thread as required, said means having a plurality of spaced substantially horizontal shoulders arranged to engage said cover thread between said guides and displace the same at the upper and lower limits of movement of said needle bar, said means having a curved surface between said shoulders arranged to engage said cover thread and displace the same to different extents in a horizontal direction during reciprocation of said needle bar.

7. In a sewing machine having a needle bar carrying a plurality of thread carrying needles and means for laying a cover thread across said needles for interengagement with the threads carried by said needles the combination which comprises fixed and spaced guides adjacent said needle bar for directing said cover thread horizontally in a portion of its travel, and means carried by said needle bar cooperating with said guides to take up and yield said cover thread as required, said means having a plurality of spaced substantially horizontal shoulders arranged to engage said cover thread between said guides and displace the same at the upper and lower limits of movement of said needle bar, said means having a curved surface between said shoulders arranged to engage said cover thread and displace the same to different extents in a horizontal direction during reciprocation of said needle bar.

8. In a sewing machine having a needle bar carrying a plurality of thread carrying needles, a lever connected with said needle bar for reciprocating the same, and means for laying a cover thread across said needles for interengagement with the threads carried by said needles the combination which comprises a thread take-up member carried by said lever cooperating with all of the threads carried by said needles for taking up and yielding said threads, fixed and spaced guides adjacent said needle bar for directing said cover thread horizontally in a portion of its travel, and means carried by said needle bar cooperating with said guides to take up and yield said cover thread as required, said means having a plurality of spaced substantially horizontal shoulders arranged to engage said cover thread between said guides and displace the same at the upper and lower limits of movement of said needle bar, said means having a curved surface between said shoulders arranged to engage said cover thread and displace the same to different extents in a horizontal direction during reciprocation of said needle bar.

References Cited in the file of this patent

UNITED STATES PATENTS

| | | |
|---|---|---|
| 1,166,037 | Barron | Dec. 28, 1915 |
| 1,251,474 | Clark | Jan. 1, 1918 |
| 1,370,164 | Tate | Mar. 1, 1921 |
| 1,407,023 | Gatchell | Feb. 21, 1922 |
| 1,414,352 | Gatchell | May 2, 1922 |
| 1,702,792 | Moffatt | Feb. 19, 1929 |
| 1,735,628 | Berger | Nov. 12, 1929 |
| 1,741,910 | Berger | Dec. 31, 1929 |
| 1,855,254 | Moffatt | Apr. 26, 1932 |
| 1,950,337 | Zeier | Mar. 6, 1934 |
| 2,056,580 | Vesconte | Oct. 6, 1936 |
| 2,079,569 | Christensen | May 4, 1937 |
| 2,305,556 | Pinkvoss | Dec. 15, 1942 |
| 2,391,519 | Smith | Dec. 25, 1945 |
| 2,550,553 | Graesser et al. | Apr. 24, 1951 |